United States Patent
Self et al.

(10) Patent No.: US 7,056,093 B2
(45) Date of Patent: Jun. 6, 2006

(54) GAS TURBINE AEROFOIL

(75) Inventors: Kevin P Self, Bristol (GB); Paul N Bennett, Cardiff (GB)

(73) Assignee: Rolls-Royce PLC, London (GB)

( * ) Notice: Subject to any disclaimer, the term of this patent is extended or adjusted under 35 U.S.C. 154(b) by 121 days.

(21) Appl. No.: 10/848,013

(22) Filed: May 19, 2004

(65) Prior Publication Data

US 2004/0253106 A1    Dec. 16, 2004

(30) Foreign Application Priority Data

Jun. 10, 2003   (GB) ................................. 0313301.4

(51) Int. Cl.
   *F01D 5/18*   (2006.01)
(52) U.S. Cl. .................... 416/97 R; 415/115
(58) Field of Classification Search ................ 415/115, 415/116; 416/97 R, 97 A See application file for complete search history.

(56) References Cited

U.S. PATENT DOCUMENTS

| | | | | |
|---|---|---|---|---|
| 3,542,486 A | * | 11/1970 | Adiutori et al. ............ 415/115 |
| 3,801,218 A | * | 4/1974 | Moore ....................... 416/97 R |
| 4,507,051 A | | 3/1985 | Lesgourgues et al. |
| 4,672,727 A | * | 6/1987 | Field ......................... 416/97 R |
| 5,496,151 A | * | 3/1996 | Coudray et al. ........... 416/97 R |
| 2002/0168264 A1 | | 11/2002 | Weigand et al. |

FOREIGN PATENT DOCUMENTS

| | | |
|---|---|---|
| GB | 1188401 | 4/1970 |
| GB | 2 202 907 A | 10/1988 |

* cited by examiner

*Primary Examiner*—Igor Kershteyn
(74) *Attorney, Agent, or Firm*—Oliff & Berridge, PLC

(57) ABSTRACT

A gas turbine aerofoil with at least one internal cavity for conveying cooling fluid through the aerofoil has at least one internal cavity adjacent the aerofoil leading edge, at least one impingement cooling passage extending from, and in flow communication with the cavity, and at least one film cooling hole extending from, and in flow communication with, the cooling passage. The impingement passage extends into the aerofoil wall in the region of the leading edge and opens into the film cooling hole. The cooling hole extends through the aerofoil wall to an external surface of the aerofoil at a position downstream of the leading edge such that, in use, cooling fluid from the cavity exits the cooling passage into the cooling hole as an impingement jet against the internal surface of the cooling hole in the region of the leading edge.

14 Claims, 2 Drawing Sheets

GAS TURBINE AEROFOIL

BACKGROUND

This invention relates to a cooled turbine aerofoil for use in a gas turbine engine.

The second law of thermodynamics dictates that the thermal efficiency of the jet engine cycle is increased by increasing the turbine entry temperature. Turbine entry temperatures of modern gas turbine engines are in excess of the melting point temperatures of the turbine components and therefore some form of cooling of the turbine aerofoils is required, that is to say the nozzle guide vane and turbine rotor blade aerofoils. Typically the aerofoils are provided with internal passages or cavities through which cooling air bleed from the engine compressor is directed. In the case of turbine rotor blades the cooling air is generally fed into inlets provided in the root portion of the blade. The cooling passages or cavities direct the cooling air through single or multi pass channels with some of the cooling air being exhausted from the internal passages through film cooling holes provided in the aerofoil external surfaces. Film cooling holes provide additional cooling of these external aerofoil surfaces where the exiting cooling air provides a thin film of relatively cool air over the aerofoil surface in the region of the film-cooling hole to protect the aerofoil from the high temperature turbine gases.

As turbine entry temperatures have increased it has been necessary to use greater amounts of cooling air from the engine compressor. However, there is a limit to the amount of cooling air that can be used for turbine cooling since increasing the amount of cooling air bled from the compressor results in reduced engine cycle efficiency and can lead to increased smoke and/or noxious gaseous emissions. Hitherto, it has be possible to increase the cooling effectiveness of the cooling air in order to minimise the amount of cooling air that is bled from the compressor.

The leading edge of air cooled aerofoils is usually provided with one or more rows of film cooling holes in the vicinity of the leading edge stagnation point, that is to say in the point on the aerofoil cross-section with the highest external pressure. Cooling the leading edge of a turbine aerofoil therefore requires that the cooling air is supplied at a pressure higher than that at the stagnation point. This is necessary to ensure that the cooling air can flow from within the respective aerofoil internal passage or cavity to the external surfaces without the possibility of the high temperature engine gases being ingested into the film cooling holes. Supplying cooling air at such high pressure has a number of consequences, in particular increased combustor pressures and reduced thermodynamic cycle deficiency.

SUMMARY

There is a requirement therefore for improved aerofoil rooting, particularly at the aerofoil leading edge, and in particular improved blade cooling at lower cooling air pressures.

According to an aspect of the invention there is provided a gas turbine aerofoil of the type having at least one internal cavity for conveying cooling fluid through the aerofoil for cooling the aerofoil in use; the said aerofoil comprising at least one internal cavity adjacent the aerofoil leading edge, at least one impingement cooling passage extending from, and in flow communication with, the said cavity, and at least one film cooling hole extending from, and in flow communication with, the said passage; the said impingement passage extending into the aerofoil wall in the region of the leading edge and opening into the said film cooling hole, the said cooling hole extending through the aerofoil wall to an external surface of the aerofoil at a position downstream of the leading edge such that, in use, cooling fluid from the said cavity exits the said cooling passage into the cooling hole as an impingement jet against the internal surface of the said cooling hole in the region of the leading edge and exits the cooling hole as a film on the external surface of the aerofoil downstream of the leading edge.

The present invention overcomes or at least partly addresses the aforementioned problems of known aerofoil leading edge cooling arrangements by combining impingement cooling with film cooling in the region of the aerofoil leading edge. By impingement cooling the leading edge the cooling air can be exhausted through film cooling holes onto the surface of the aerofoil at a point or points away from the leading edge stagnation point that is to say at positions, where external gas pressures are lower, than in known cooling arrangements where the cooling air is exhausted through film cooling holes at or closely adjacent to the aerofoil stagnation point. In this way, the cooling air can be supplied at a lower pressure reducing the combustor pressure loss due to air being bled at higher pressures. In this arrangement the cooling air is first used to cool the aerofoil leading edge region by impingement of the cooling air against the internal surface of the cooling hole or holes in the region of the leading edge, than to provide further cooling of the aerofoil leading edge by convection cooling as the cooling air flows through the film cooling holes, and finally to provide a film on the external surface or surfaces of the aerofoil downstream of the leading edge. By increasing the cooling effectiveness of the cooling air the amount of cooling air bled from the engine compressor can be reduced resulting in increased cycle efficiency.

In preferred embodiments the film cooling hole passes through the aerofoil wall from the pressure surface side to the suction surface side of the aerofoil in the region of the leading edge. In this way it is possible to form a film of cooling air on both the pressure surface and suction of the aerofoil in the region of the leading edge downstream of the stagnation point. A single hole passing through the aerofoil wall section at it's leading edge between the pressure and suction surfaces is preferable to separate suction and pressure surfaces film cooling holes since a single hole arrangement is structurally more simple and relatively easier to manufacture using known hole forming methods, for example laser or EDM drilling.

The film cooling hole may be substantially straight or may be arcuate in the sense that it bends in an arcuate path between the pressure and suction surfaces of the aerofoil. Preferably the curvature of the arcuate cooling hole is such that the cooling hole opens onto the external surfaces at a relatively shallow angle with respect to the aerofoil surfaces. It is preferable that the curvature of the film cooling hole is slightly less that the curvature of the aerofoil surface at the leading edge. In embodiments where the cooling hole is arcuate it is preferred that the whole is formed by EDM drilling.

Preferably, the film cooling hole is angled which respect to the aerofoil pressure and/or suction surface at its respective pressure and or suction side exit opening. This is readily achieved with either the straight or arcuate type cooling hole arrangement where the exit sections of the hole are angled with respect to the aerofoil surfaces.

In preferred embodiments the aerofoil comprises a plurality of film cooling holes spaced apart in the spanwise direction of the aerofoil, that is to say a plurality of film cooling holes are arranged in rows in the radial direction of the aerofoil when assembled in a turbine. Preferably the aerofoil also comprises a plurality of impingement passages spaced apart in the spanwise direction of the aerofoil, such that each impingement passage opens into a respective film cooling hole. In this way each film cooling hole receives cooling air from the internal cavity through a respective impingement hole connecting the film cooling hole to the internal aerofoil cavity. In other embodiments each film cooling hole is provided with at least two impingement cooling passages spaced apart along the length of the cooling hole such that the cooling hole is connected to the aerofoil internal cavity by two such impingement passages.

The impingement passage or passages may comprise an elongate slot, or series of slots positioned in end to end relation in the spanwise direction of the aerofoil, with the film cooling wholes branching from the slot or slots at positions along the length of the aerofoil towards the pressure and/or suction surfaces. Thus, a single slot may be provided along the spanwise length of the aerofoil or a series of discreet slots may be spaced in end-to-end relation with one or more of the slots feeding either a single cooling hole or a plurality of cooling holes.

Preferably the impingement passage or passages, whether in the form of holes or slots, extend in a direction from the internal cavity of the aerofoil towards the leading edge stagnation point of the aerofoil so that the impingement jet of cooling fluid provided by the impingement passage acts on the aerofoil interior wall surface nearest the leading edge stagnation point. The or each impingement cooling passage may extend substanually normal to the longitudinal direction of the cooling hole or holes it is connected to.

In a preferred embodiment the cooing hole or holes is/are inclined with the respect to the plane normal to the spanwise direction of the aerofoil.

Preferably the aerofoil is cast and the impingement passage or passages is/are integrally cast in the interior of the aerofoil and the film cooling hole or holes is/are drilled in the cast component. Preferably the cooling holes are EDM or laser drilled.

The invention also contemplates a turbine rotor blade or nozzle guide vane comprising an aerofoil according to the above aspect of the present invention.

BRIEF DESCRIPTION OF DRAWINGS

Various embodiments of the invention will now be more particularly described, by way of example, with reference to the accompanying drawings, in which.

DETAILED DESCRIPTION OF EMBODIMENTS

Figure 1:
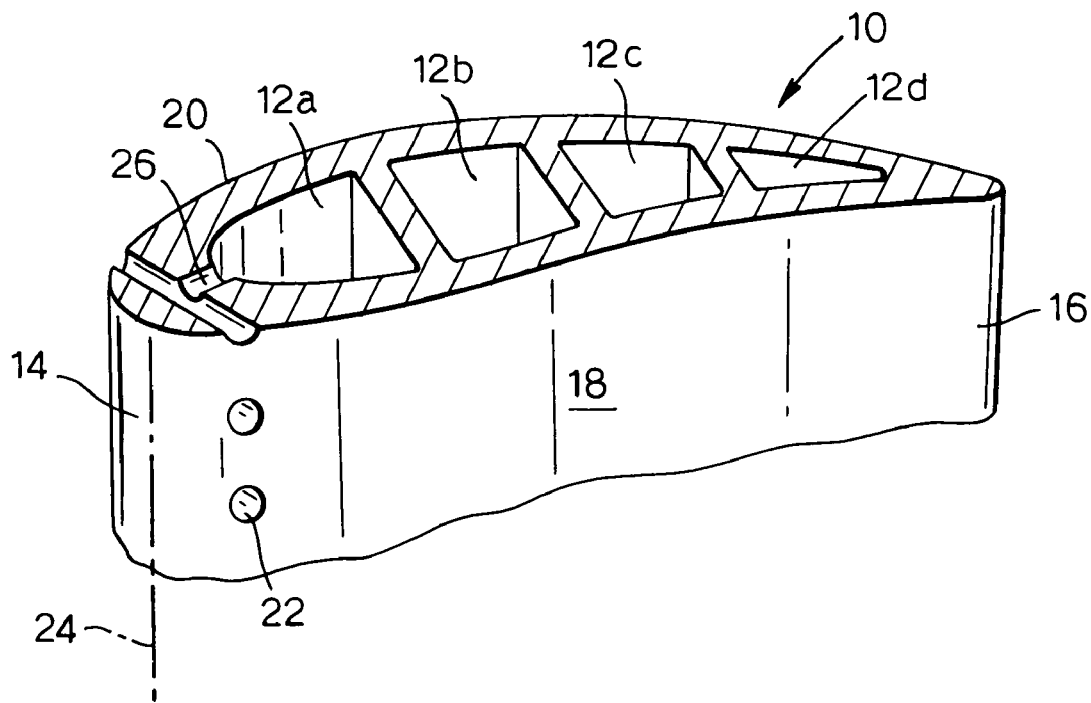
FIG. 1 shows a gas turbine aerofoil cut away to reveal detail of the aerofoil cooling arrangement of the present invention.

Referring to FIG. 1, a cross-section through a gas turbine rotor blade aerofoil 10 is shown revealing the interior of the aerofoil which comprises a succession of substantially mutually parallel cooling air passages 12a to 12d, which passages extend in the spanwise direction of the aerofoil 10. One or more of the internal passages or cavities 12a to 12d are connected to a cooling air entry port (not shown) on the underside of the rotor blade, that is to say on the underside of the blade platform (not shown) in the region of the blade root (not shown). The cooling air entry port receives low or high pressure air bled from the engine compressor, which air cools the aerofoil 10 by heat transfer from the internal surfaces of the passages 12a to 12d as it flows though the passages and out through one or more exit ports (not shown) in the tip portion or shroud of the rotor blade.

The aerofoil 10 includes a leading edge 14 and a trailing edge 16 with a pressure surface 18 on one side of the blade and a suction surface 20 on the other side thereof. A plurality of film cooling holes 22 are provided in the region of the leading edge 14 of the aerofoil. The film cooling holes 22 are spaced apart in the spanwise direction of the aerofoil and extend between the pressure and suction surfaces 18, 20 of the aerofoil such that the exit apertures of the cooling holes open onto the respective pressure and suction surfaces at a position slightly downstream of the leading edge 14, the locus 24 of which represents the point of highest pressure, or stagnation point, at the leading edge. The exit apertures of the cooling holes 22 are positioned sufficiently downstream from the stagnation point 24 such that cooling air flowing through the film cooling holes 22 can flow onto the pressure and suction surfaces of the aerofoil at pressures lower than the leading edge stagnation pressure.

In the arrangement of FIG. 1 the film cooling holes 22 are straight and pass through the aerofoil wall between the leading edge and the first or forward most passage or cavity 12a. The film cooling holes 22 are fed with cooling air from the forward most, or leading edge, passage or cavity 12a through a respective interconnecting impingement passage in the form of a hole or passage 26. The impingement passage or hole 26 extends between the cavity 12a and a respective film cooling hole 22. The impingement holes 26 extend substantially in the direction of the leading edge stagnation point such that, in use, cooling air from the cooling passage or cavity 12a enters the film cooling hole 22 as an impingement jet of cooling air which impinges against the internal surface of the film cooling hole 22 in the region of the leading edge for cooling the aerofoil wall in the region of the leading edge stagnation point. The cooling air then exits the cooling hole 22 through the respective pressure and suction surface openings to form a film on both of those surfaces downstream of the leading edge stagnation point 24.

Figure 2:
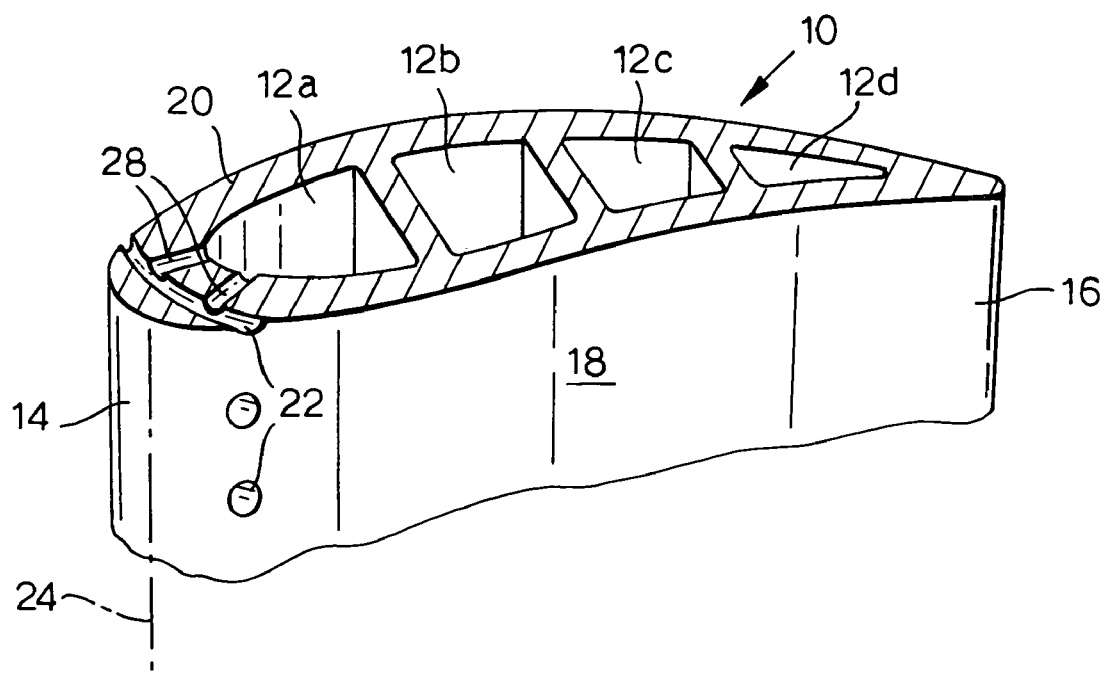
FIG. 2 is a view similar to that of FIG. 1 which shows a second embodiment of the present invention.

The aerofoil cooling arrangement in the embodiment of FIG. 2 is similar to that shown in FIG. 1 except that the film cooling holes 22 are arcuate in shape passing through the aerofoil wall section at the leading edge thereof between the pressure and suction surfaces 18 and 20. The curvature of the arcuate cooling holes 22 is slightly smaller than that of the external surface of the aerofoil at the leading edge. This difference in curvature ensures that the exit apertures of the holes 22 opening on to the respective pressure and suction surfaces of the aerofoil have a relatively shallow angle with respect to the respective aerofoil surfaces so that the direction of cooling air flowing through the film cooling holes does not change direction abruptly when it exits the cooling hole on to the respective surface of the aerofoil. The arcuate cooling holes 22 are also slightly longer than the straight holes in the arrangement of FIG. 1 which results in greater cooling effectiveness of the cooling air passing through the holes. The curvature of the arcuate film cooling holes also ensures there is less variation in the wall thickness between the holes and the external surface of the aerofoil at the leading edge resulting in more uniform cooling of the aerofoil leading edge.

The arcuate film cooling holes 22 are connected to the leading edge air cooling cavity 12a by a pair of impingement cooling passages in the form of holes 28 which are spaced apart and angled slightly with respect to each other so that cooling air exits the holes 28 as an impingement jet against the internal surface of the arcuate cooling hole 22 on the side of the hole nearest the leading edge, with the two impingement jets directed to different sides of the stagnation point on the aerofoil cross section.

In the arrangement of FIGS. 1 and 2 the film cooling holes 22 and impingement holes 26, 28 have substantially the same circular cross section, size and shape with the holes 26 and 28 being formed in substantially the same cross sectional plane of the aerofoil. This is more clearly shown in the cross-section view of FIG. 3 which shows the spatial and dimensional relationship of the film cooling holes and the respective impingement holes for the cooling arrangement of the leading edge in the embodiment of FIG. 1.

Figure 3:
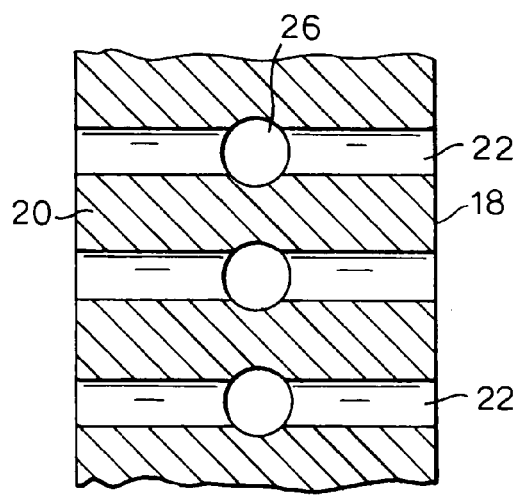
FIG. 3 is a cross-section view of the aerofoil of FIG. 1 along line 3—3 showing one arrangement of impingement and film cooling holes.
Figure 4:
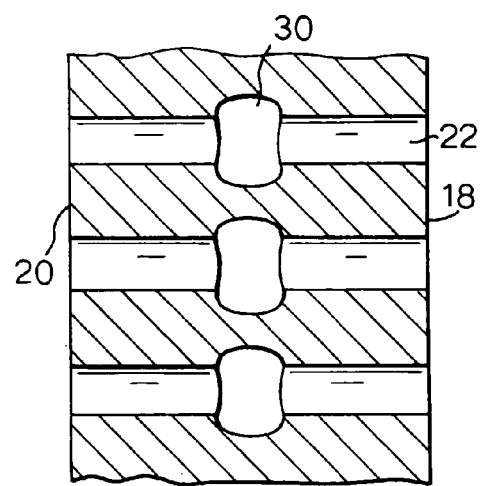
FIGS. 4 to 6 are similar cross-section views to that of FIG. 3 showing alternative arrangements of impingement passage and film cooling holes.
Figure 5:
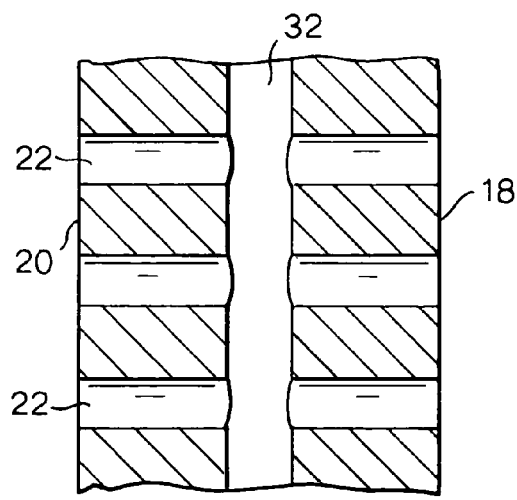
Figure 6:
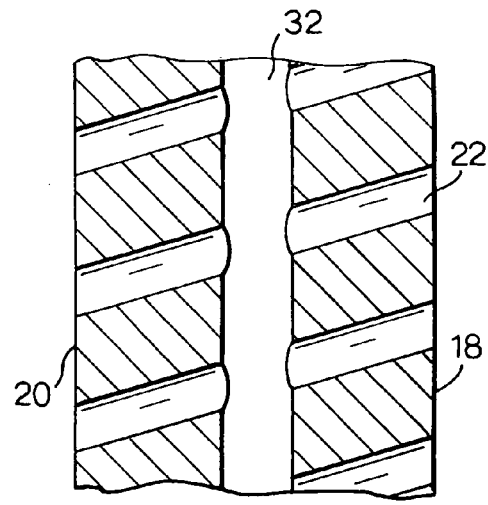

FIGS. 4 to 6 show various alternative arrangements to that of FIG. 3. In FIG. 4 the circular cross-section impingement holes 26 are replaced by rectangular cross-section slots 30 that have a spanwise dimension greater than the diameter of the film cooling holes. The slots 30 are arranged to communicate with the respective film cooling holes 22 as the impingement slots 30 are arranged in alignment with respect to the holes 22 as in the arrangement of FIG. 1. In this respect the slots extend end to end in the spanwise direction of the aerofoil having a spacing dimension, or pitch, between adjacent slots equal to the spanwise pitch of film cooling holes 22.

In the arrangement of FIG. 5 the impingement slots 30 are replaced by a continuous impingement slot 32 that extends substantially along the whole of the spanwise length of the aerofoil feeding the film cooling holes 22 along the length of aerofoil. In this arrangement the continuous slot 32 is in flow communication with the leading edge air cooling cavity 12a on one side of the slot and the respective film cooling holes 22 on the other side of the slot.

In a slightly modified embodiment shown in FIG. 6 the film cooling holes 22 are angled with respect to the spanwise slot 32 such that the film cooling holes have an exit aperture on the suction surface of the aerofoil at a different spanwise position to the exit aperture on the pressure surface of the aerofoil. It will be understood of course that various combinations of the arrangements disclosed in FIGS. 3 to 6 may be used in embodiments of the present invention other than those explicitly shown in the respective drawings. For example the angled film cooling holes 22 shown in FIG. 6 may be used in combination with the circular cross-section impingement holes 26 of FIG. 3 or the rectangular cross-section slots of FIG. 4.

Although aspects of the invention have been described with reference to the embodiments shown in the accompanying drawings, it is to be understood that the invention is not limited to those precise embodiments and that various changes and modifications may be effected without further inventive skill and effort. For example, the invention contemplates embodiments where the aerofoil is part of a turbine rotor blade or a nozzle guide blade. In addition the invention contemplates embodiments where the impingement hole 26 feeds a film cooling hole 22 that has an exit aperture and only one side of the blade and arrangements where separate impingement cooling holes 26 or 28 or slots 30 feed respective film cooling holes on one or the other side of the aerofoil only.

The invention claimed is:

1. A gas turbine aerofoil of the type having at least one internal cavity for conveying cooling fluid through the aerofoil for cooling the aerofoil in use, the aerofoil comprising:
    at least one internal cavity adjacent the aerofoil leading edge;
    at least one impingement cooling passage extending from, and in flow communication with, the least one internal cavity; and
    at least one film cooling hole extending from, and in flow communication with, the at least one impingement cooling passage,
    wherein the at least one impingement cooling passage extends into the aerofoil wall in the region of the leading edge and opens into, and terminates in, the at least one film cooling hole, the at least one film cooling hole passes through the aerofoil wall from the pressure surface side to the suction surface side of the aerofoil at a position downstream of the leading edge such that, in use, cooling fluid from the at least one internal cavity exits the at least one impingement cooling passage into the at least one film cooling hole as an impingement jet against the internal surface of the at least one film cooling hole in the region of the leading edge and exits the at least one film cooling hole as a film on the external surface of the aerofoil downstream of the leading edge.

2. An aerofoil as claimed in claim 1, wherein the at least one film cooling hole is substantially straight.

3. An aerofoil as claimed in claim 1, wherein the at least one film cooling hole is arcuate.

4. An aerofoil as claimed in claim 3, wherein the film cooling hole is angled with respect to at least one of the aerofoil pressure surface or the aerofoil suction surface at a respective pressure or suction side exit opening.

5. An aerofoil as claimed in claim 1, comprising a plurality of film cooling holes spaced apart in the spanwise direction of the aerofoil.

6. An aerofoil as claimed in claim 5, comprising a plurality of impingement cooling passages spaced apart in the spanwise direction of the aerofoil, wherein each impingement passage opens into a respective film cooling hole.

7. An aerofoil as claimed in claim 6, wherein each film cooling hole is provided with at least two impingement cooling passages spaced along a length of the film cooling hole.

8. An aerofoil as claimed in claim 5, wherein the impingement cooling passage comprises an elongate slot, or a series of slots positioned in end to end relation, extending in the spanwise direction of the aerofoil with the plurality of film cooling holes branching from the slot or slots at positions along the length of the aerofoil towards the pressure and suction surfaces of the aerofoil.

9. An aerofoil as claimed in claim 1, wherein the at least one film cooling hole is inclined with respect to a plane normal to the spanwise direction of the aerofoil.

10. An aerofoil as claimed in claim 1, wherein the at least one impingement cooling passage extends substantially normal to the longitudinal direction of the respective at least one film cooling hole.

11. An aerofoil as claimed in claim 1, wherein the aerofoil is cast and the at least one impingement cooling passage is integrally cast in the interior of the aerofoil.

12. An aerofoil as claimed in claim 1, wherein the at least one film cooling hole is a drilled hole.

13. An aerofoil as claimed in claim 12, wherein the at least one film cooling hole is an EDM or laser drilled hole.

14. A turbine rotor blade or nozzle guide vane comprising an aerofoil according to claim 1.

* * * * *